United States Patent [19]

Kyan

[11] 4,328,130

[45] May 4, 1982

[54] SHAPED CHANNELED CATALYST

[75] Inventor: Chwan P. Kyan, Mantua, N.J.

[73] Assignee: Chevron Research Company, San Francisco, Calif.

[21] Appl. No.: 199,121

[22] Filed: Oct. 22, 1980

[51] Int. Cl.³ .............................................. B01J 35/02
[52] U.S. Cl. ............................................... 252/477 R
[58] Field of Search ..................... 252/477 R; 428/156

[56] References Cited

U.S. PATENT DOCUMENTS

| Re. 30,155 | 11/1979 | Gustafson | 208/216 PP |
|---|---|---|---|
| 2,408,164 | 9/1946 | Foster | 252/477 R |
| 3,347,798 | 10/1967 | Baer et al. | 252/448 |
| 3,674,680 | 7/1972 | Hoekstra et al. | 208/111 |
| 3,764,565 | 10/1973 | Jacobs et al. | 252/470 |
| 3,957,627 | 5/1976 | Herrington et al. | 208/216 R |
| 3,966,644 | 6/1976 | Gustafson | 252/455 R |
| 3,997,426 | 12/1976 | Montagna et al. | 208/10 |
| 4,116,819 | 9/1978 | Frayer et al. | 208/216 R |
| 4,133,777 | 1/1979 | Frayer et al. | 252/465 |

*Primary Examiner*—W. J. Shine
*Attorney, Agent, or Firm*—D. A. Newell; W. H. Hooper; A. H. Uzzell

[57] ABSTRACT

A shaped catalyst and methods of use are provided. The catalyst has substantially the shape of a cylinder having a plurality of longitudinal channels extending radially from the circumference of the cylinder and defining protrusions therebetween, said protrusions having a maximum width greater than the maximum width of the channels.

9 Claims, 5 Drawing Figures

U.S. Patent
May 4, 1982
4,328,130
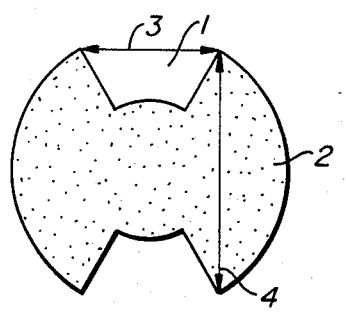
FIG._1.
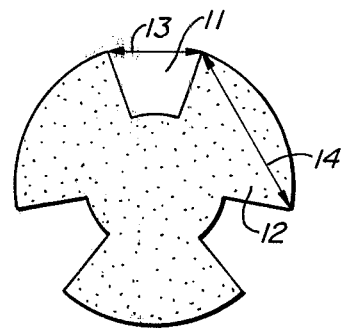
FIG._2.
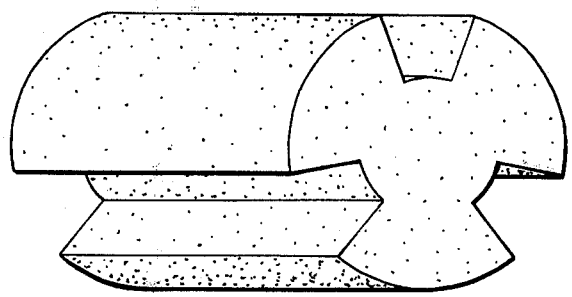
FIG._3.
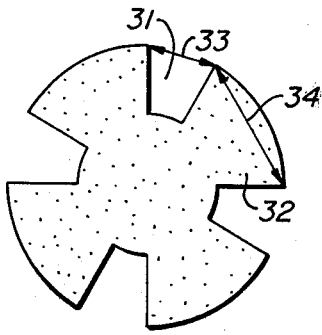
FIG._4.
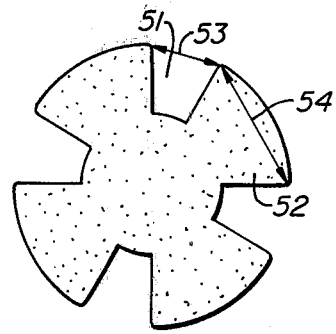
FIG._5.

SHAPED CHANNELED CATALYST

BACKGROUND OF THE INVENTION

This invention relates to catalytic compositions and their use, especially for the conversion of hydrocarbonaceous feedstocks. In particular, the invention involves the use of catalysts having a shape which provides great flexibility for a variety of applications.

A number of catalyst shapes have been described in the prior art. U.S. Pat. No. 2,408,164 to Foster Discloses catalyst shapes including solid and hollow cylinders, elongated star shapes, cylinders with corrugated edges, etc. Similar shapes are also shown in U.S. Pat. No. 3,997,426 to Montagna et al. U.S. Pat. Nos. 3,966,644 and RE. 30,155 issued to Gustafson disclose trilobal catalysts for hydrocarbon conversion. U.S. Pat. Nos. 3,674,680 and 3,764,565 to Hoekstra and Jacobs disclose catalyst shapes designed to eliminate catalytic material more than 0.0015 inches from the catalyst surface. U.S. Pat. No. 3,347,798 to Baer et al discloses the production of hollow bead catalysts. U.S. Pat. No. 3,957,627 discloses spherical catalysts having a void center and a hole extending to the external surface. U.S. Pat. Nos. 4,116,819 and 4,133,777 disclose catalysts in the shape of elongated extrudates having alternating longitudinal grooves and protrusions on the surface.

The purpose of providing shaped catalyst particles has generally been to increase the surface area/volume ratios over conventional shapes such as cylinders, spheres, etc. While the surface area/volume ratio can be increased merely by reducing the size of catalyst particles, reductions in size generally result in larger pressure drops and smaller void sizes in fixed catalyst beds. A difficulty encountered in many prior art shaped catalysts is that the shapes permit the particles to interlock. Interlocking can occur whenever protrusions of the shaped catalyst are sized so that they can easily enter the recesses of adjacent catalyst particles. Interlocking of catalysts particles reduces the void fraction of the catalyst bed, decreases the effective surface area of the catalyst bed, and can increase the pressure drop across the bed.

SUMMARY OF THE INVENTION

It is an object of this invention to provide a hydrocarbon conversion catalyst having a shape which can provide high surface areas with reduced probability of interlocking. It is a further object to provide a catalyst shape which offers a designer great flexibility to accommodate the requirements of liquid hold-up time. Another object is to provide such a catalyst which can be used in any fixed bed catalytic process including conversion of hydrocarbonaceous feedstocks, for example, isomerization, alkylation, reforming, and hydroprocessing, including hydrocracking, hydrotreating, hydrofining, hydrodemetallation, hydrodesulfurization, and hydrodenitrogenation. These and other objects are provided according to this invention by a shaped catalyst composition having substantially the shape of a cylinder having a plurality of longitudinal channels extending radially from the circumference of the cylinder and defining protrusions therebetween. The protrusions have maximum widths greater than the maximum widths of the channels. Preferably, the widths of the protrusions at or near the surface of the cylindrical shape (i.e., the distal portion) are greater than the widths of the channels at the surface of the cylindrical shape. The ratio of the maximum width of the protrusions to the maximum width (preferably the external width) of the channels can be from about 1.05 to 20 or more preferably from about 1.2 to 3. All that is necessarly for converting a hydrocarbonaceous feedstock according to this invention is that the feedstock be contacted with a bed containing shaped catalyst particles of this invention under the appropriate hydrocarbon conversion conditions, as are well known in the art. The bed can contain other solid particles, catalytic or non-catalytic, if desired.

BRIEF DESCRIPTION OF THE VIEWS OF THE DRAWINGS

FIG. 1 is a cross-sectional view of a circular cylindrically-shaped catalyst having two channels and two protrusions.

FIG. 2 is a cross-sectional view of a circular cylindrically-shaped catalyst having three channels and three protrusions.

FIG. 3 depicts the cylindrical shape of the catalyst of FIG. 2.

FIG. 4 is a cross-sectional view of a circular cylindrically-shaped catalyst having four channels and four protrusions.

FIG. 5 is a cross-sectional view of a circular cylindrically-shaped catalyst having four channels and four protrusions with slightly rounded corners.

DETAILED DESCRIPTION

The shaped catalysts of this invention are generally cylindrically shaped, having longitudinal channels in the surface of the cylinder which extend radially toward the central region of the cylinder. The cross-section of the channeled cylinder can be circular, elliptical, or even irregularly shaped. Protrusions are defined between the longitudinally extending channels. In order to reduce the probability of interlocking between adjacent catalyst particles, it is important that the protrusions have larger maximum widths than the channels. For example, a ratio of the maximum width of the protrusions to the maximum width of the channels can be from about 1.05 to 20; preferably, from about 1.2 to 3. The width of the channel and of the protrusions is measured in a direction perpendicular to a line extending from the central axis of the cylindrical shape. In the case of cylinders having irregular or non-circular cross-sections, the central axis is defined as the axis passing through the center of the smallest circle which circumscribes the cross-sectional area. Preferably, the maximum widths of the distal portion of the protrusions are larger than the external widths of the channels. By external width, it is meant the width of the channel at the surface of the cylindrical shape farthest from the axis. The ratio of the maximum width of the distal one-half or one-fourth (by radial length) of the protrusions to the external width of the channels should be in the range of 1.05 to 20, preferably in the range of 1.2 to 3.

The width and the depth of the channels are determined by the required catalyst strength and the desired liquid hold-up time for reactants. Deeper channels result in increased liquid hold-up time and decreased strength. Wider channels result in decreased liquid hold-up time and decreased strength.

The catalyst of this invention can be easily prepared by extruding a catalyst mixture by conventional methods through an appropriately shaped die. The extrudate may be cut or broken to provide the desired catalyst length. The extrudate can be in the form of refractory oxides used as support material, for example, alumina, silica, silica-alumina, magnesia, silica-magnesia, and other mixtures of well known catalyst support oxides, e.g., oxides of elements other than transition elements. The catalyst can contain active transition metals in the form of metals, metal oxides, metal sulfides, etc., in amounts appropriate for the catalytic purpose. The catalyst may also contain one or more forms of aluminosilicate zeolites such as faujasite, mordenite, Y-type zeolite and any of the family of ZSM zeolites such as ZSM-5-type zeolites described in U.S. Pat. No. 3,729,409. The extrudate can be calcined as is conventional in the art before and after impregnation with metals.

FIG. 1 depicts a catalyst of this invention having two channels and two protrusions. The depth of the channel is approximately one-half the radius of the cylinder. Channel 1 is substantially smaller in width than protrusion 2. The maximum width 3 of channel 1 is also the external width. The maximum width 4 of protrusion 2 is significantly larger than the external width of the channel.

FIGS. 2 and 3 illustrate a three-channeled cylindrical catalyst having channel 11 extending approximately one-half of the radius of the cylinder. The maximum and external width 13 of channel 11 is substantially smaller than maximum width 14 of the distal half of protrusion 12.

FIG. 4 illustrates a catalyst having four protrusions and four channels. The maximum and external width 33 of channel 31 is approximately one-half the maximum width 34 of the distal half of protrusion 32.

FIG. 5 depicts a catalyst essentially having the shape of FIG. 4 with slightly rounded corners. Maximum width 53 of channel 51 is about one-half of the maximum width 54 of the distal one-half of protrusion 52. While some degree of rounding of the corners can be tolerated, it is preferred that the corners formed between the side surfaces of the channels and the external circumferential surface of the cylinder be sharp to reduce the amount of channel volume which is accessible to the protrusions.

The physical properties of the catalyst shape of this invention compared to prior art catalyst shapes are illustrated in Table 1.

TABLE 1

| Catalyst | A | B | C | D |
|---|---|---|---|---|
| Diameter (in.) | 1/16 | 1/19 | 1/13 | 1/11 |
| (cm.) | 0.16 | 0.13 | 0.20 | 0.23 |
| Length/Diameter (approx.) | 2 | 2 | 2 | 2 |
| Shape | Cylinder | Trilobal | 3-channeled Cylinder | Cylinder |
| Particle (g/cc) Density | 1.46 | 1.34 | 1.34 | 1.34 |
| Bulk (g/cc) Density | 0.91 | 0.77 | 0.62 | 0.84 |
| Packing Factor | 0.62 | 0.57 | 0.46 | 0.63 |
| Void Fraction | 0.38 | 0.43 | 0.54 | 0.37 |

Catalysts A and D were cylindrical shapes. Catalyst B was a fluted shape having a trilobal shape depicted in U.S. Pat. No. 4,028,227 to Gustafson. Catalyst C was a three-channel cylindrical catalyst having the shape of FIGS. 2 and 3. The excellent packing qualities of the catalysts are found from their low packing factor and higher void fractions, which lead to better catalyst utilization as will be shown herein. The packing factor is obtained by dividing bulk density of the particle by particle density. The packing factor, then, is equal to the volume of catalyst per volume of reactor. The remainder of the reactor volume is void, consequently the void fraction is equal to one minus the packing factor. The packing factor, void fraction, and bulk density do not depend significantly upon particle size. Catalysts B through D had the same particle densities, thereby enabling a direct comparison of the effect of catalyst shape. The bulk density of trilobal Catalyst B was significantly lower than the cylindrical catalyst D and the bulk density of the catalyst C of this invention was substantially lower than either shape. The high void fraction of the bed of channeled catalyst is a clear advantage over the prior art shapes, as will be shown herein.

Catalyst A was prepared from an alumina source designate Catapal SB which is available from Continental Oil Company. Catapal alumina is an alpha alumina monohydrate by-product of the manufacture of alcohols from aluminum alkyls.

Catalyst B was made from an alpha alumina monohydrate designated alumina SA, and obtained from Kaiser Aluminum Corporation.

For purposes of the cobalt-molybdenum-alumina desulfurization catalysts described, no essential catalytic difference between these aluminas has been found. Catalyst C was prepared from a 60/40 weight mixture of Catapal and Kaiser alumina. Catalyst D was also prepared from the 60/40 Catapal/Kaiser mixture. The Kaiser alumina was used to improve the strength of the finished catalyst. Each catalyst was prepared by peptizing the alumina with an aqueous nitric acid solution to form a paste. The paste was extruded, dried and calcined. The calcined extrudate was impregnated with a solution containing cobalt and phosphomolybdic acid. The catalysts were tested for hydrodesulfurization activity and fouling by contacting with a 260° C.–540° C. fraction of California vacuum distillate gas oil, 21° API (0.93 sp. gravity at 16° C.), containing 1.2% organic sulfur. The reaction conditions for Catalysts A & B were 2.0 hours$^{-1}$ LHSV, 30.6 atm. total pressure, 534 meters$^3$/meters$^3$ H$_2$ gas rate, and a constant product sulfur level of 0.07%. Reaction conditions for Catalysts C and D were the same as for Catalysts A and B, except the pressure was elevated to 600 psig. Table II depicts the performance of the catalysts.

TABLE II

| Catalyst | A | B | C | D |
|---|---|---|---|---|
| Diameter (in.) | 1/16 | 1/19 | 1/13 | 1/11 |
| Shape | Cylinder | Trilobal | 3-channeled Cylinder | Cylinder |
| Cobalt (wt. %) | 3.1 | 3.0 | 3.2 | 2.8 |
| Molybdenum (wt. %) | 12.9 | 12.1 | 12.8 | 12.4 |
| Phosphorus (wt. %) | 1.8 | 1.7 | 1.8 | 1.8 |
| N$_2$ Adsorption Surface Area (m$^2$/gm) | 169 | 198 | 187 | 178 |
| Desulfurization Test Starting Temperature (°C.) | 383 | 386 | 391 | 388 |
| Desulfurization Fouling Rate | 0.009 | 0.008 | 0.003 | 0.004 |

TABLE II-continued

| Catalyst | A | B | C | D |
|---|---|---|---|---|
| (°C./hr.) | | | | |

A comparison of Catalysts A and B shows that the catalytic performance of the trilobal catalyst was essentially the same as for the cylindrical catalyst of similar size. The packing factor for the trilobal catalyst was 8% less than for the cylinder (Table I). A comparison of Catalysts C and D shows that the catalytic performance of the 3-channeled cylinder was also essentially the same as for the cylindrical catalyst of similar size. However, the packing factor for the 3-channeled catalyst was 27% less than for the cylindrical catalyst. Consequently, the channeled catalyst of this invention can achieve the same activity and level of conversion as cylindrical or trilobal catalysts, with a much larger void fraction, resulting in improved economy of catalyst material.

The preferred catalyst shape is one similar to that shown in FIGS. 1 through 4. It is circular cylinder, such as an extrudate, having longitudinal channels extending into the cylinder to approximately 0.4 to 0.6, preferably 0.5 of the cylindrical radius. The channels are equally distributed around the circumference of the cylinder. As shown in FIGS. 1-5, the faces of the channels, which are also the side faces of the protrusions, extend along radii of the cylinder, hence the channels and the protrusions subtend central angles measured from the axis of the cylinder, and the protrusions widen toward the surface. It is preferred that the channels be equally distributed around the circumference of the cylinder and subtend solid angles of about 0.25 to 0.75, more preferably about 0.5, times the angles subtended by the protrusions. This shape employing large protrusions and relatively narrow channels causes the protrusions to have a low probability of interlocking with the channels. The preparation and use of the catalyst of this invention is illustrated by the following examples.

EXAMPLE 1

A hydrodesulfurization catalyst is prepared according to the procedure described in U.S. Pat. No. 4,113,661 issued to P. W. Tamm, Sept. 12, 1978, entitled, "Method for Preparing a Hydrodesulfurization Catalyst," the disclosure of which is incorporated herein by reference. An 80/20 by weight mixture of Catapal alumina and Kaiser alumina as described herein, are sized in the range below about 150 microns and treated by thoroughly admixing the mixed powders with an aqueous solution of nitric acid, where for each formula weight of the alumina ($Al_2O_3$) about 0.1 equivalent of acid is used. The treated alumina powder is in the form of a workable paste. A sample of this paste completely disperses when one part is slurried in four parts by weight of water. The pH of the slurry is in the range of about 3.8 to about 4.2, usually about 4.0. After aqueous acid treatment of the powders, aqueous ammonium hydroxide is thoroughly admixed into the paste in an amount equivalent to about 80% of the ammonium hydroxide theoretically required to completely neutralize the nitric acid; that is, about 0.08 equivalent of the hydroxide is added to the paste per formula weight of the alumina present. The ammonium hydroxide used is desirably about an 11% by weight solution because the volatiles (material evolved during drying and calcination) content of the treated and neutralized solids should be in the range of 50–70 weight percent. With the addition and thorough admixing of ammonium hydroxide, the paste changes to a free-flowing particulate solid suitable as a feed to an extruder. When the sample of the solid is slurried in water (4 parts water to one part solid) the pH of the slurry is in the range from 5 to 7.5, usually about 6.5. A conventional auger-type extruder with a die of the appropriate shape, for example, those shown in FIGS. 1-5, is employed for shaping the partially neutralized solids into a precursor of the catalyst carrier. The formed precursor is freed of loosely-held water by an initial moderate drying step, for example, at a temperature in the range of 150° F.–500° F. The preparation of the carrier is then completed by calcining the dried extrudate at a temperature between 500° F.–1700° F. in a dry or humid atmosphere. The resulting carrier has a pore volume of about 0.7 cc per gram, of which at least about 85% is furnished by pores having a diameter in the range between about 80 and 150 Angstroms. Less than about 1.0% of pore volume is furnished by pores larger than 1000 Angstroms. It is known that this carrier serves as an excellent base for hydrocarbon hydrodesulfurization catalysts for treating feedstocks which contain substantial amounts of soluble metal contaminants. The catalyst to be useful for hydrodesulfurization, or hydrodenitrogenation should contain at least one hydrogenation agent and preferably contain a combination of two such agents. The metals and/or the compounds of the metals, particularly the sulfides and oxides, of Group VI-B, especially of molybdenum and tungsten, and Group VIII, especially of cobalt and nickel, are satisfactory hydrogenation agents. Combinations of nickel-molybdenum and nickel-tungsten are preferred for hydrodenitrogenation, and the combination of cobalt-molybdenum is preferred for hydrodesulfurization.

The catalytic agents are incorporated into the calcined carrier by any of the well-known methods, preferably by impregnation procedures ordinarily employed in the catalyst preparation art. Alternately, the metallic catalytic agents can be added to the mixture prior to extrusion, either by comulling or cogellation. An especially outstanding catalyst is made by a single-step impregnation of the alumina using a solution of a cobalt or nickel salt and a heteropolymolybdic acid, for example, phosphomolybdic acid. In general, the amount of the catalytic agents calculated as the pure metal should be in the range of about 2 to 30 parts by weight per 100 parts of the composition; preferably, the cobalt or nickel content of the catalysts should be in the range of 2 to 5 parts calculated as the pure metal and the molybdenum or tungsten content should be 5 to 20 parts calculated as a pure metal. It should be understood that the metals can be present in the final catalyst in the compound form such as the oxide or sulfide form as well as in the elemental form. The hydroprocessing catalyst when used for petroleum distillate feedstocks should preferably have a diameter (circumscribing cylinder diameter) of about 1/16 to 1/10 inch (0.16 to 0.25 cm.) and a length to diameter ratio of 1.5 to 5. When used for residuum feedstocks, the catalyst should preferably have a diameter of about 1/32 to 1/16 inch (0.08 to 0.16 cm.) with a length to diameter ratio of 1.5 to 5.

The hydrodesulfurization or hydrodenitrogenation catalyst of this invention is suitable for hydrotreating heavy hydrocarbonaceous feeds such as coal liquids or fractions resulting from the dissolution of coals, including peat, lignite, sub-bituminous, and bituminous coals.

Other suitable feeds for desulfurization include hydrocarbonaceous products or fractions from tar sands, shale oil, and petroleum, including atmospheric or vacuum residua, topped crude, reduced crude, solvent deasphalted residua, as well as distillate material such as vacuum gas oil from petroleum, coal liquids, etc. All that is necessary for the hydroprocessing of hydrocarbonaceous feedstocks according to this invention is that the feedstock be contacted with a bed containing the catalyst of this invention under hydroprocessing conditions, as are well known in the art. Suitable hydroprocessing conditions include temperatures of 250° C.–450° C., pressures of from 30–200 atmospheres, hydrogen gas rates of 180–1800 cubic meters per cubic meter of feedstock and liquid hourly space velocities of 0.1–10 reciprocal hours.

EXAMPLE 2

Cogelled extruded catalysts can be prepared by the method described in U.S. Pat. No. 3,673,079 issued June 27, 1972 to B. F. Mulaskey and E. F. Chilton entitled "Catalyst Manufacture" which is incorporated herein in its entirety by reference. For example, aluminum oxide is reacted with hydrochloric acid and water to form a 20% aluminum chloride solution. Nickel powder is reacted with HCl and water to form a 30% nickel chloride solution. Five hundred eighty-six grams of aluminum chloride solution is put into a large container. To this is added 248 grams of the nickel-chloride solution and 180 grams of glacial acetic acid. A second solution is made by diluting 1153 grams of sodium silicate with 2 liters of water. A freshly prepared dilute solution of the sodium silicate is added slowly to the first solution with vigorous stirring to form a clear silica sol in the aluminum and nickel chloride solution. To this clear sol solution is then added dilute aqueous ammonia (16.5 wt % $NH_4OH$). The ammonia is added slowly with stirring until a gelatinous slurry cogel of the metal hydroxides is reacted at a pH of 7.5. The slurry is then heated to 65° C. for one hour. The slurry is filtered hot. The resulting filter cake is removed from the filter and spread on a drying tray to uniform shape and thickness. The reformed filter cake is then scored into uniform one-half inch squares. The material is then put into a drying oven and slowly dried at about 120° C. The filter cake slowly shrinks and breaks on the score lines. The material takes on a characteristic translucent appearance at the correct moisture level of between 70 to 80 percent, preferably about 75 percent volatiles. One will find that the entire square of gelatinous precipitate has dried very uniformly. Each square is removed from the oven as the proper volatile level is reached. The material is now ready for shaping. It is extruded in a conventional ram-type extruder with appropriately shaped die such as those having a shape corresponding to FIGS. 1–5, and washed, dried and calcined. The finished catalyst contains 6 weight percent nickel and 12 weight percent alumina and is suitable for hydrocracking hydrocarbonaceous feeds to produce lower boiling point materials. Suitable feedstocks for hydrocracking include distillates such as vacuum gas oil and metal containing distillates from petroleum, coal-derived liquids, and hydrocarbonaceous material from tar sands and shale oils. Hydrocracking is also performed on residual feedstocks such as atmospheric and vacuum residual.

EXAMPLE 3

A catalyst support is prepared according to methods shown in Example 1 as further described in U.S. Pat. No. 4,082,697 issued Apr. 4, 1978 to P. W. Tamm entitled "Catalyst Carrier, Its Method of Preparation and a Reforming Catalyst Supported on the Carrier," the disclosure of which is incorporated herein by reference. The calcined carrier is coimpregnated by the well-known porefill method with an aqueous solution of chloroplatinic, perrhenic, and hydrochloric acids sufficient to provide a dried composition containing calculated as metal about 0.4 weight percent each of platinum and rhenium and about 1.4 weight percent chlorine as chloride. The metal contents are typically higher than those normally used in prior art reforming catalysts because the novel shaped catalyst of this invention provides high void fractions. Since the efficiency of catalytic reforming process is related to the total metal content per reactor volume, a higher metal concentration is required for the catalyst of this invention. Concentrations of 0.3 to 1.0% of each of two noble metals are preferred, more preferably about 0.4% platinum and about 0.8% rhenium, with a chloride content of about 1.4%. Typical reformable hydrocarbonaceous feedstocks derived from petroleum, coal liquefaction products, oil shale products, and tar sand products are contemplated for use in the reforming process. Representative feedstocks include naphthas boiling within the limits of from 20° C.–300° C., preferably 65° C.–250° C. and fractions thereof, for naphtha, or blends thereof. The feeds should be essentially free of sulfur, that is should contain less than about 10 ppm by weight of sulfur calculated as the element and preferably less than 1 ppm by weight.

All that is necessary according to this invention is that a reformable hydrocarbonaceous feedstock be contacted with a bed containing the catalyst of this invention under reforming conditions as are well known in the art. Suitable reforming conditions include reaction temperature of 300° C.–600° C., preferably 370° C.–570° C., a pressure in the range of 1 to 70 atmospheres, preferably 3 to 50 atmospheres, and a liquid hourly space velocity of 0.1 to 10, preferably 1 to 5 reciprocal hours.

It will be appreciated by those skilled in the catalyst art that the shaped catalyst of this invention is useful for virtually any catalyst application, and especially for fixed-bed catalysis. While the examples herein have been directed to petroleum processing, it will be apparent that the shaped catalysts are suitable for a wide variety of catalytic process, especially fixed bed processes having diffusion inhibited reactions which would benefit from increased hold-up time and large reactor void fraction. The use of the catalyst of this invention in processes other than the conversion of hydrocarbonaceous feedstocks is contemplated as equivalent to the methods disclosed herein.

What is claimed is:

1. A shaped catalyst composition having substantially the shape of a cylinder having a plurality of longitudinal channels extending radially from the circumference of the cylinder and defining protrusions therebetween, said protrusions having maximum widths greater than the maximum widths of said channels.

2. The catalyst composition of claim 1 wherein the maximum widths of the distal one-half of said protrusions are from about 1.05 to 20 times the external widths of said channels.

3. The catalyst composition of claim 1 wherein the maximum widths of the distal one-half of said protrusions are from about 1.2 to 3 times the external widths of said channels.

4. The catalyst composition of claim 1 wherein said channels are substantially equally distributed around the circumference of said cylinder.

5. The catalyst composition of claim 2, 3 or 4 wherein the cylinder is a circular cylinder and the side faces of said channels extend along a radius of the cylinder and have a radial depth of approximately 0.4 to 0.6 times the radius of said cylinder, the side faces of said channels and the circumferential surface of the cylinder forming sharp corners therebetween, said channels and said protrusions subtending central angles measured from the axis of said cylinder such that the angles subtended by said channels are about 0.25 to 0.75 times the angles subtended by said protrusions.

6. The catalyst of claim 5 wherein the angles subtended by said channels are about 0.5 times the angles subtended by said protrusions.

7. The catalyst of claim 5 having two protrusions and two channels.

8. The catalysts of claim 5 having three protrusions and three channels.

9. The catalysts of claim 5 having four protrusions and four channels.

* * * * *